US011938811B2

(12) United States Patent
Yang et al.

(10) Patent No.: US 11,938,811 B2
(45) Date of Patent: Mar. 26, 2024

(54) MULTI-STAGE SHIFTING ACTUATOR FOR A VEHICLE POWER TRANSFER UNIT

(71) Applicant: GKN Automotive Limited, Birmingham (GB)

(72) Inventors: Lei Yang, Novi, MI (US); Brent Peura, Famington, MI (US)

(73) Assignee: GKN Automotive Limited, Birmingham (GB)

( * ) Notice: Subject to any disclaimer, the term of this patent is extended or adjusted under 35 U.S.C. 154(b) by 236 days.

(21) Appl. No.: 17/617,520

(22) PCT Filed: Jun. 29, 2020

(86) PCT No.: PCT/US2020/040054
§ 371 (c)(1),
(2) Date: Dec. 8, 2021

(87) PCT Pub. No.: WO2020/264470
PCT Pub. Date: Dec. 30, 2020

(65) Prior Publication Data
US 2022/0297536 A1 Sep. 22, 2022

Related U.S. Application Data

(60) Provisional application No. 62/868,772, filed on Jun. 28, 2019.

(51) Int. Cl.
B60K 17/34 (2006.01)
B60K 17/346 (2006.01)
(Continued)

(52) U.S. Cl.
CPC .......... B60K 17/346 (2013.01); B60K 17/354 (2013.01); F16D 3/06 (2013.01); F16D 11/14 (2013.01); F16D 2023/123 (2013.01)

(58) Field of Classification Search
CPC .... B60K 17/34; B60K 17/346; B60K 17/453; F16D 3/06; F16D 11/14; F16D 23/12; F16D 2023/123
See application file for complete search history.

(56) References Cited

U.S. PATENT DOCUMENTS 5,284,068 A 2/1994 Frost
6,824,487 B2 11/2004 Williams et al.
(Continued)

FOREIGN PATENT DOCUMENTS

CN 1890487 A 1/2007
CN 102563011 A 7/2012
(Continued)

OTHER PUBLICATIONS

Written Opinion & International Search Report for PCT/US2020/040054 dated Sep. 18, 2020, 9 pages.
(Continued)

Primary Examiner — Jason D Shanske
Assistant Examiner — Daniel M. Keck
(74) Attorney, Agent, or Firm — Jennifer M. Brumbaugh; Reising Ethington P.C.

(57) ABSTRACT

A vehicle power transfer unit assembly includes an input shaft, a shift collar, an outer cam ring, and an inner cam ring. The shift collar is engaged with the input shaft and operable between a first position and a second position. The outer cam ring is disposed around a portion of the shift collar. The outer cam ring includes an inner surface defining a plurality of levels. The inner cam ring is engaged with the shift collar and disposed radially inward from the outer cam ring. The inner cam ring includes a jaw engageable with the plurality of levels. The shift collar is moved from the first position to the second position when the jaw is moved from engage-
(Continued)

ment with one of the plurality of levels to engagement with another of the plurality of levels.

19 Claims, 14 Drawing Sheets

(51) Int. Cl.
*B60K 17/354* (2006.01)
*F16D 3/06* (2006.01)
*F16D 11/14* (2006.01)
*F16D 23/12* (2006.01)

(56) References Cited

U.S. PATENT DOCUMENTS

| | | | |
|---|---|---|---|
| 7,303,502 B2 | 12/2007 | Thompson | |
| 8,567,582 B2 | 10/2013 | Silva et al. | |
| 8,986,148 B2 | 3/2015 | Downs et al. | |
| 9,182,012 B2 | 11/2015 | Greiss et al. | |
| 9,695,885 B2 * | 7/2017 | Tamoto | F16D 27/118 |
| 9,822,874 B2 | 11/2017 | Volpert et al. | |
| 9,903,420 B2 | 2/2018 | Engerer et al. | |
| 9,915,298 B2 | 3/2018 | Heravi et al. | |
| 10,065,499 B2 | 9/2018 | Gerding | |
| 10,221,900 B2 | 3/2019 | Heravi et al. | |
| 10,280,986 B2 * | 5/2019 | Palazzolo | B60K 17/3467 |
| 10,323,720 B2 | 6/2019 | Rekow et al. | |
| 10,563,704 B2 * | 2/2020 | Pritchard | B60K 17/02 |
| 10,731,715 B2 | 8/2020 | Heravi et al. | |
| 11,371,565 B2 | 6/2022 | Zeiss | |
| 2002/0055409 A1 * | 5/2002 | Kanazawa | B60K 17/346 |
| | | | 475/249 |
| 2005/0167230 A1 | 8/2005 | Gumpoldsberger et al. | |
| 2005/0199437 A1 | 9/2005 | Downs | |
| 2007/0155579 A1 | 7/2007 | Thompson | |
| 2012/0247241 A1 | 10/2012 | Takahashi et al. | |
| 2014/0224066 A1 | 8/2014 | Cook et al. | |
| 2015/0300488 A1 | 10/2015 | Volpert | |
| 2015/0308519 A1 | 10/2015 | Heravi et al. | |
| 2015/0321554 A1 | 11/2015 | Oram et al. | |
| 2016/0061274 A1 | 3/2016 | Engerer et al. | |
| 2017/0352463 A1 | 12/2017 | Heravi et al. | |

FOREIGN PATENT DOCUMENTS

| | | | | |
|---|---|---|---|---|
| CN | 103596794 A | | 2/2014 | |
| CN | 104797865 A | | 7/2015 | |
| CN | 105034796 A | | 11/2015 | |
| CN | 105283685 A | | 1/2016 | |
| CN | 106232410 A | | 12/2016 | |
| CN | 107524731 A | | 12/2017 | |
| CN | 109249802 A | * | 1/2019 | ............ B60K 17/02 |
| CN | 109854700 A | | 6/2019 | |
| CN | 112041578 B | * | 1/2023 | ............ F16D 11/04 |
| DE | 102017129602 A1 | | 6/2019 | |
| JP | H082268 A | | 1/1996 | |
| JP | H1016601 A | | 1/1998 | |

OTHER PUBLICATIONS

Yu, Feng, et al.; Configuration and Shifting Principle of Dual Clutch Automatic Transmission; dated Dec. 31, 2009, (3 pages).
Wu, Haikang, et al.; Journal of Tongji University; Power Shift Feature Research of a Novel Active Transmission for Parallel Hybrid Vehicle Use; dated Dec. 31, 2014, (7 pages).
CN Office Action for CN Application No. 202080047398.8 dated Sep. 11, 2023, (22 pages).

* cited by examiner

MULTI-STAGE SHIFTING ACTUATOR FOR A VEHICLE POWER TRANSFER UNIT

CROSS REFERENCE TO RELATED APPLICATIONS

This PCT application claims priority to U.S. Provisional Application No. 62/868,772 filed on Jun. 28, 2019, the disclosure of which is considered part of the disclosure of this application and is hereby incorporated by reference in its entirety.

FIELD

The present disclosure relates generally to power transfer units for vehicles.

BACKGROUND

In general, vehicle drivelines transmit torque from a vehicle's engine to its wheels. Automotive drivelines sometimes include power transfer units (PTUs, also known as power take-off units) for selectively distributing torque among shafts in the drivelines. The PTUs are often equipped in four-wheel and all-wheel automotive driveline configurations. A power transfer unit typically consists of a housing that encloses and supports gears, shafts, and bearings. Shifting may occur between engagement of various components (e.g., gears, shafts, etc.) to selectively modify the torque distributed in the driveline. While fork shifters have been used to shift between engagement of various components, oftentimes fork shifters may experience offset load, which may lead to damage or fracture.

This section provides background information related to the present disclosure which is not necessarily prior art.

SUMMARY

One aspect of the disclosure provides a vehicle power transfer unit assembly comprising an input shaft, a shift collar engaged with the input shaft and operable between a first position and a second position, an outer cam ring disposed around a portion of the shift collar, the outer cam ring including an inner surface defining a plurality of levels, and an inner cam ring engaged with the shift collar and disposed radially inward from the outer cam ring, the inner cam ring including a jaw engageable with the plurality of levels, wherein the shift collar is moved from the first position to the second position when the jaw is moved from engagement with one of the plurality of levels to engagement with another of the plurality of levels.

Implementations of the disclosure may include one or more of the following optional features. In some implementations, the input shaft includes an outer surface having an outer spline and the shift collar includes an inner surface having an inner spline meshingly-engageable with the outer spline, and wherein the input shaft is configured to transfer a torque from the input shaft to the shift collar via engagement of the outer spline and the inner spline.

The plurality of levels may include a first level and a second level, and a distance along a central axis of the outer cam ring from the first level to the input shaft is less than a distance along the central axis of the outer cam ring from the second level to the input shaft.

The vehicle power transfer unit assembly may include a spring exerting a biasing force upon the shift collar to bias the shift collar toward the outer cam ring. The jaw may be selectively moveable from engagement with one of the plurality of levels to engagement with another of the plurality of levels by overcoming the biasing force of the spring.

The shift collar may be engaged with a first component in the first position and a second component in the second position, the engagement of the shift collar with the first component defining a first torque ratio and the engagement of the shift collar with the second component defining a second torque ratio different from the first torque ratio. The first component may be part of a differential gear subassembly and the second component is part of a planetary gear subassembly.

The vehicle power transfer unit assembly may include a motor configured to drive rotation of the outer cam ring to selectively move the jaw from engagement with one of the plurality of levels to engagement with another of the plurality of levels.

The vehicle power transfer unit assembly may include a planetary gear subassembly and a differential gear subassembly, the shift collar being selectively engageable with the planetary gear subassembly and the differential gear subassembly.

The shift collar may be operable between a third position and a fourth position.

Another aspect of the disclosure provides a vehicle power transfer unit assembly comprising an input shaft, a shift collar engaged with the input shaft and operable between four positions including a first position, a second position, a third position, and a fourth position, an outer cam ring disposed around a portion of the shift collar, the outer cam ring including an inner surface defining four levels including a first level, a second level, a third level, and a fourth level, the outer cam ring including an engagement surface facing the input shaft and each of the four levels increasing in distance from the engagement surface relative to an adjacent one of the four levels, and an inner cam ring engaged with the shift collar and disposed radially inward from the outer cam ring, the inner cam ring including a jaw selectively engageable with each of the four levels, wherein the shift collar is moved from one of the four positions to an adjacent one of the four positions when the jaw is moved from engagement with one of the plurality of levels to engagement with another of the plurality of levels. This aspect may include one or more of the following optional features.

The input shaft may include an outer surface having an outer spline and the shift collar includes an inner surface having an inner spline meshingly-engageable with the outer spline, and wherein the input shaft is configured to transfer a torque from the input shaft to the shift collar via engagement of the outer spline and the inner spline.

The vehicle power transfer unit may include a spring exerting a biasing force upon the shift collar to bias the shift collar toward the outer cam ring. The jaw may be selectively moveable from engagement with one of the four levels to engagement with another of the four levels by overcoming the biasing force of the spring.

The shift collar may be engaged with a first component in the first position and a second component in the fourth position, the engagement of the shift collar with the first component defining a first torque ratio and the engagement of the shift collar with the second component defining a second torque ratio different from the first torque ratio. The first torque ratio may be less than the second torque ratio. The first component may be part of a differential gear subassembly and the second component is part of a planetary gear subassembly.

The vehicle power transfer unit may include a motor configured to drive rotation of the outer cam ring to selectively move the jaw from engagement with one of the four levels to engagement with another of the four levels.

The vehicle power transfer unit may include a planetary gear subassembly and a differential gear subassembly, the shift collar being selectively engageable with the planetary gear subassembly and the differential gear subassembly.

When the shift collar is in the third position, no torque may be transferred to wheels of the vehicle via the differential gear subassembly.

The details of one or more implementations of the disclosure are set forth in the accompanying drawings and the description below. Other aspects, features, and advantages will be apparent from the description and drawings, and from the claims.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Figure 1:
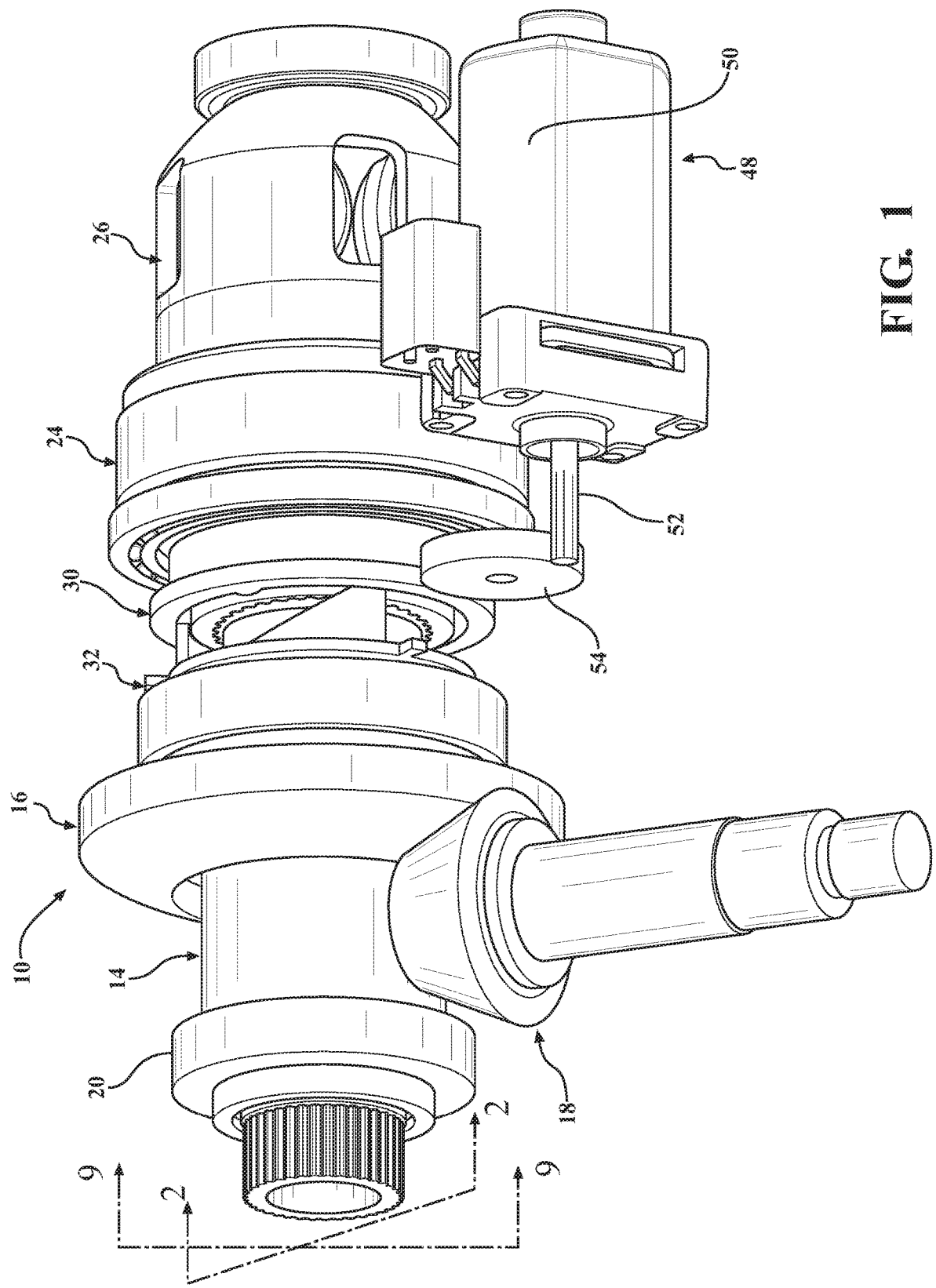
FIG. 1 is a perspective view of a power transfer unit (PTU) assembly in accordance with principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Referring to the figures, a power transfer unit (PTU) assembly 10 for a vehicle is generally shown. The PTU assembly 10 may be implemented in an automotive vehicle or any other suitable vehicle. The PTU assembly 10 may satisfy torque and durability requirements oftentimes imposed by automotive manufacturers. Hence, the torque duty cycle capacity of the PTU assembly 10 may be augmented. While illustrated by one embodiment in the figures, the PTU assembly 10 can have different designs and constructions in other embodiments, some of which are described below. Indeed, the exact design and construction of the PTU assembly 10 may depend on the particular application in which the PTU assembly 10 is installed. The applications can involve various steering, engine, and transmission components, and the accompanying packaging demands, all of which may dictate the design and construction of the PTU assembly 10. The PTU assembly 10 may be implemented in a front axle, a rear axle, or any suitable location of a vehicle.

In the embodiment of FIGS. 1-5, the PTU assembly 10 is a multi-piece mechanism with components that work together in order to produce a desired torque output. In this embodiment, the PTU assembly 10 includes an input shaft 12, an intermediate shaft 14, a ring gear 16, and an output gear 18. Other components can include bearings 20, seals, and yet additional shafts and gears. A PTU housing, cover, and/or intermediate structure (not shown) composed of a metal or non-metallic material may enclose and support components of the PTU assembly 10.

Figure 2:
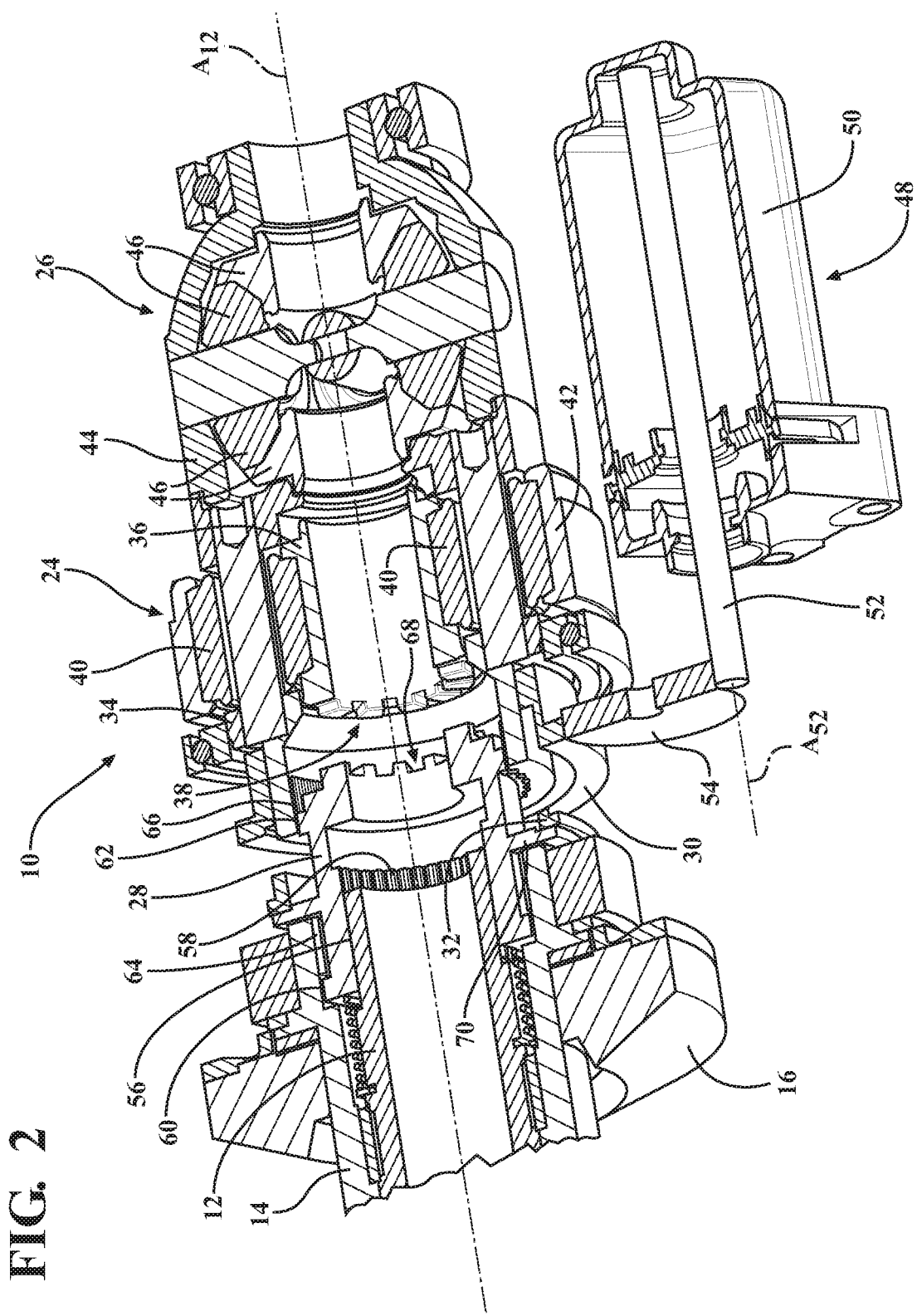
FIG. 2 is a cross-sectional view of the PTU assembly of FIG. 1 taken along line 2-2 in FIG. 1.
Figure 3:
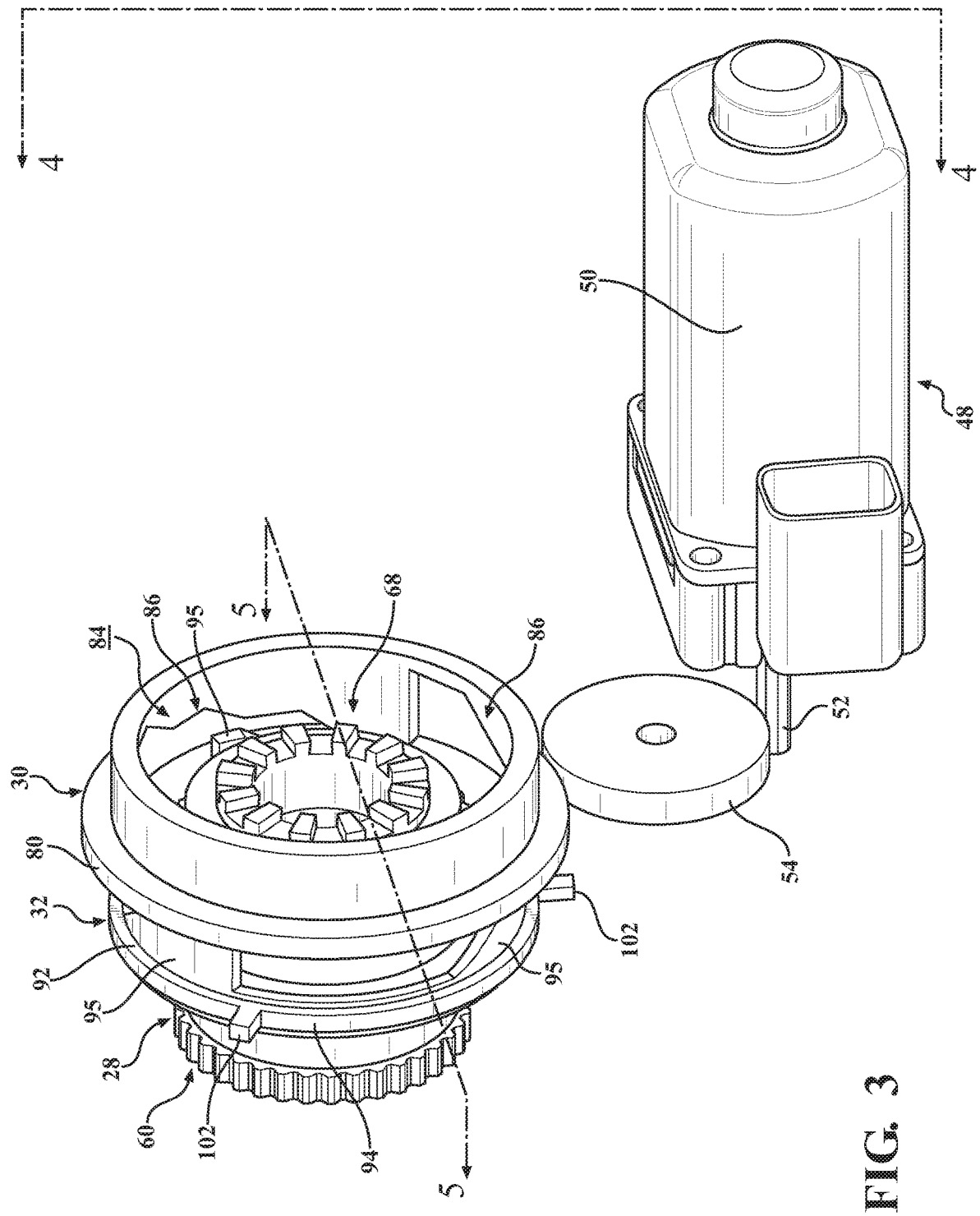
FIG. 3 is a perspective view of the PTU assembly of FIG. 1 with certain components removed to provide clarity.
Figure 4:
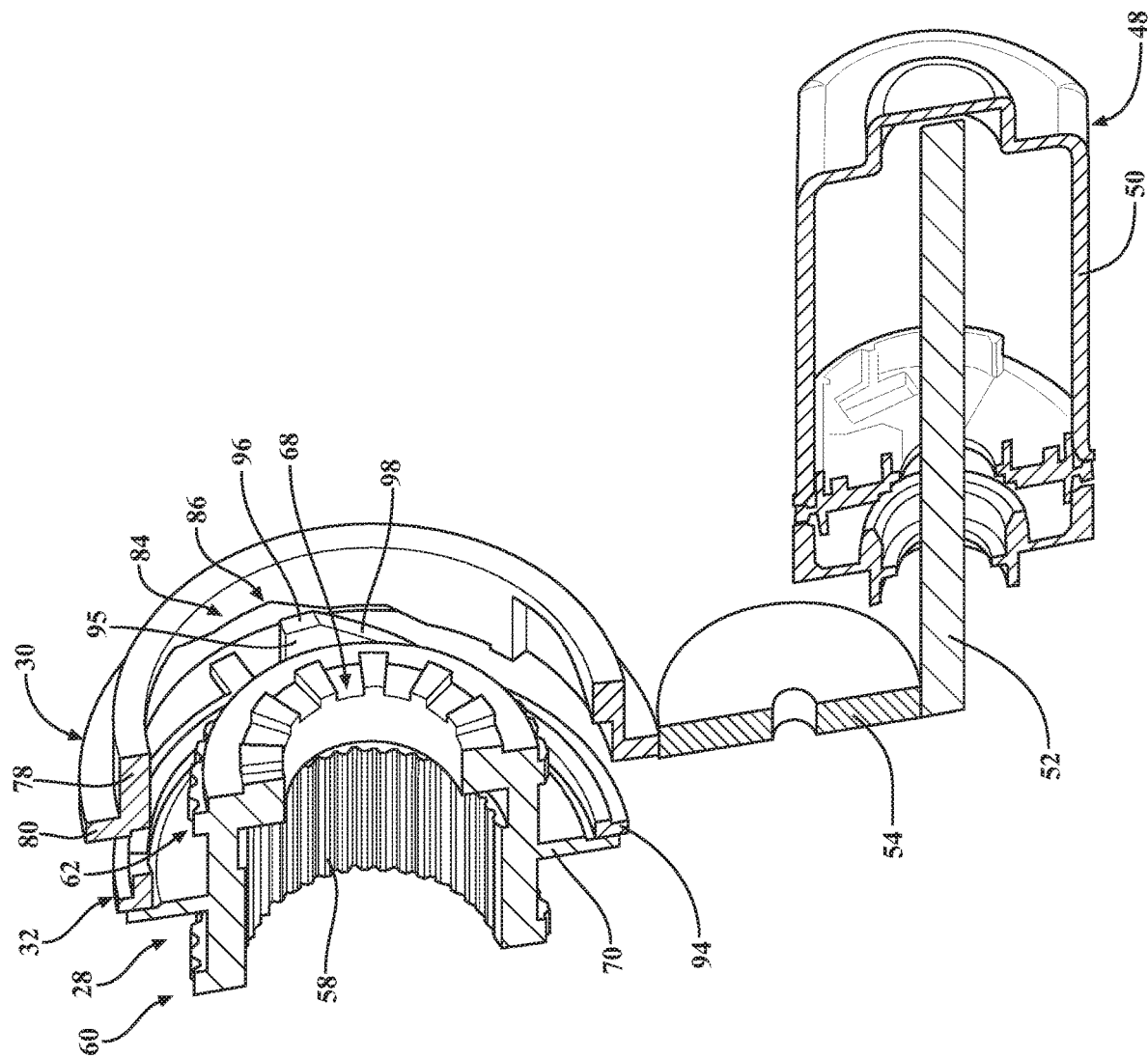
FIG. 4 is a cross-sectional view of the PTU assembly of FIG. 3 taken along line 4-4 in FIG. 3.
Figure 5:
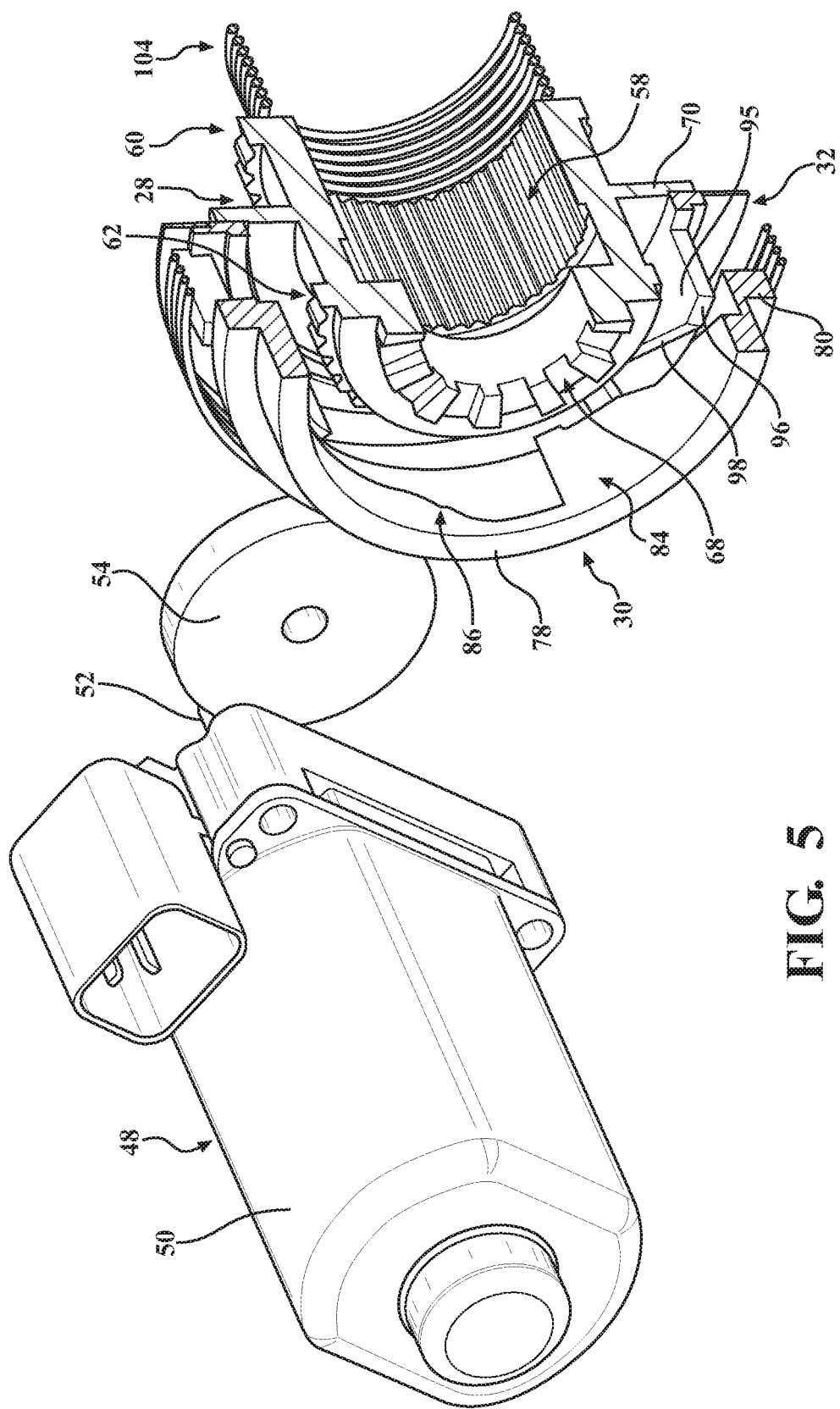
FIG. 5 is another cross-sectional view of the PTU assembly of FIG. 3 taken along line 5-5 in FIG. 3.
Figure 6A:
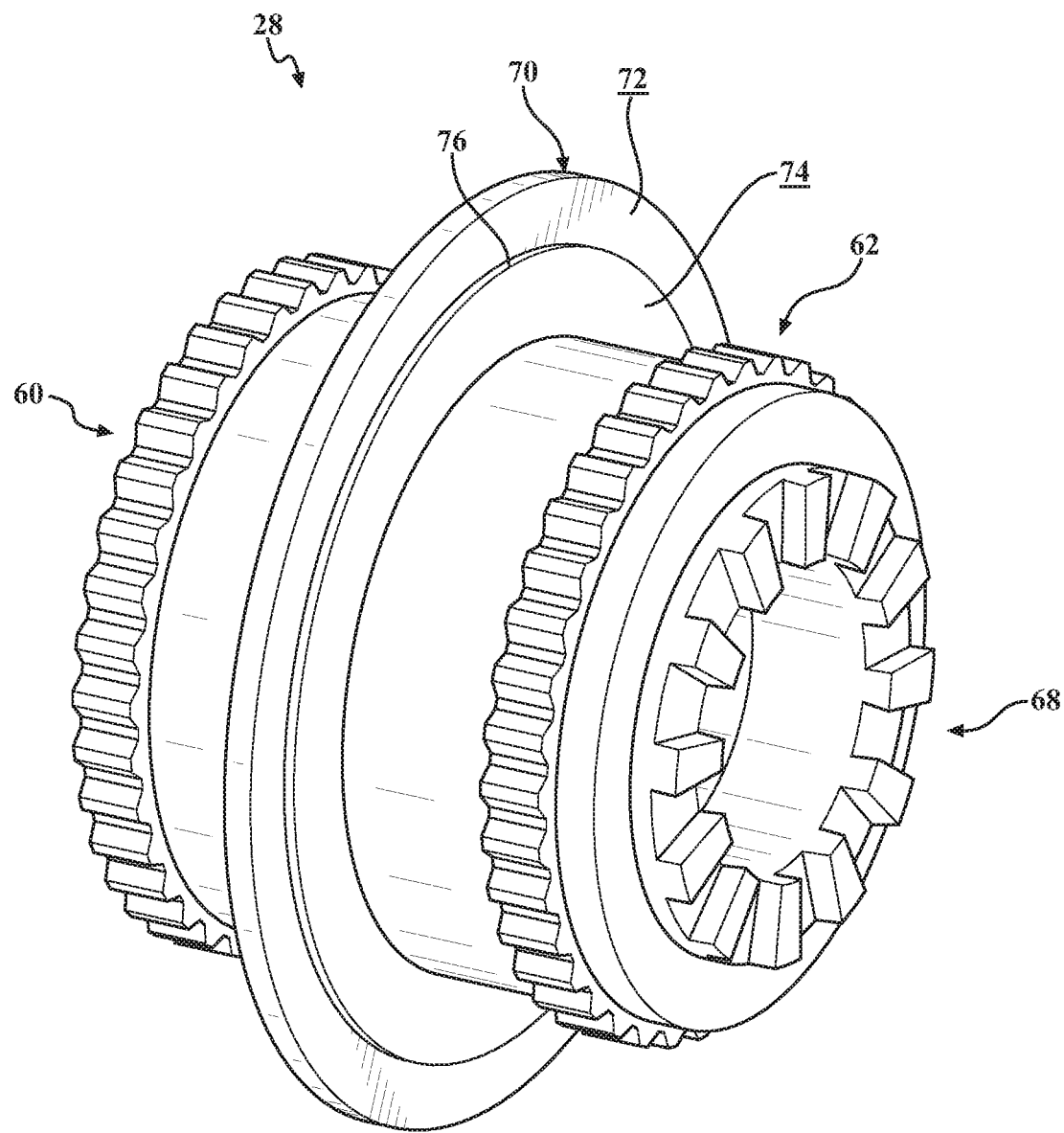
FIG. 6A is a front perspective view of a shift collar of the PTU assembly of FIG. 1.
Figure 6B:
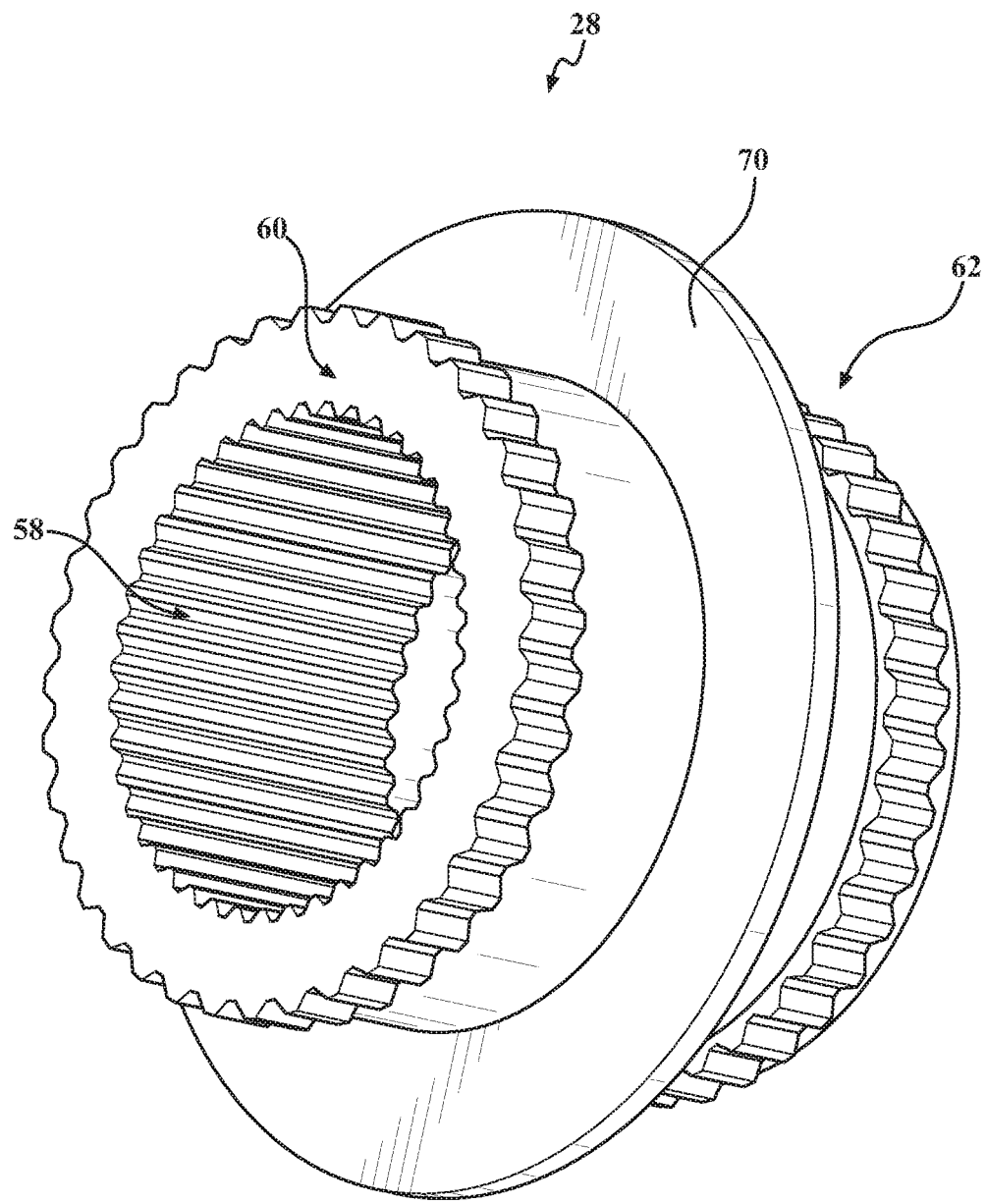
FIG. 6B is a rear perspective view of the shift collar of FIG. 6A.
Figure 7:
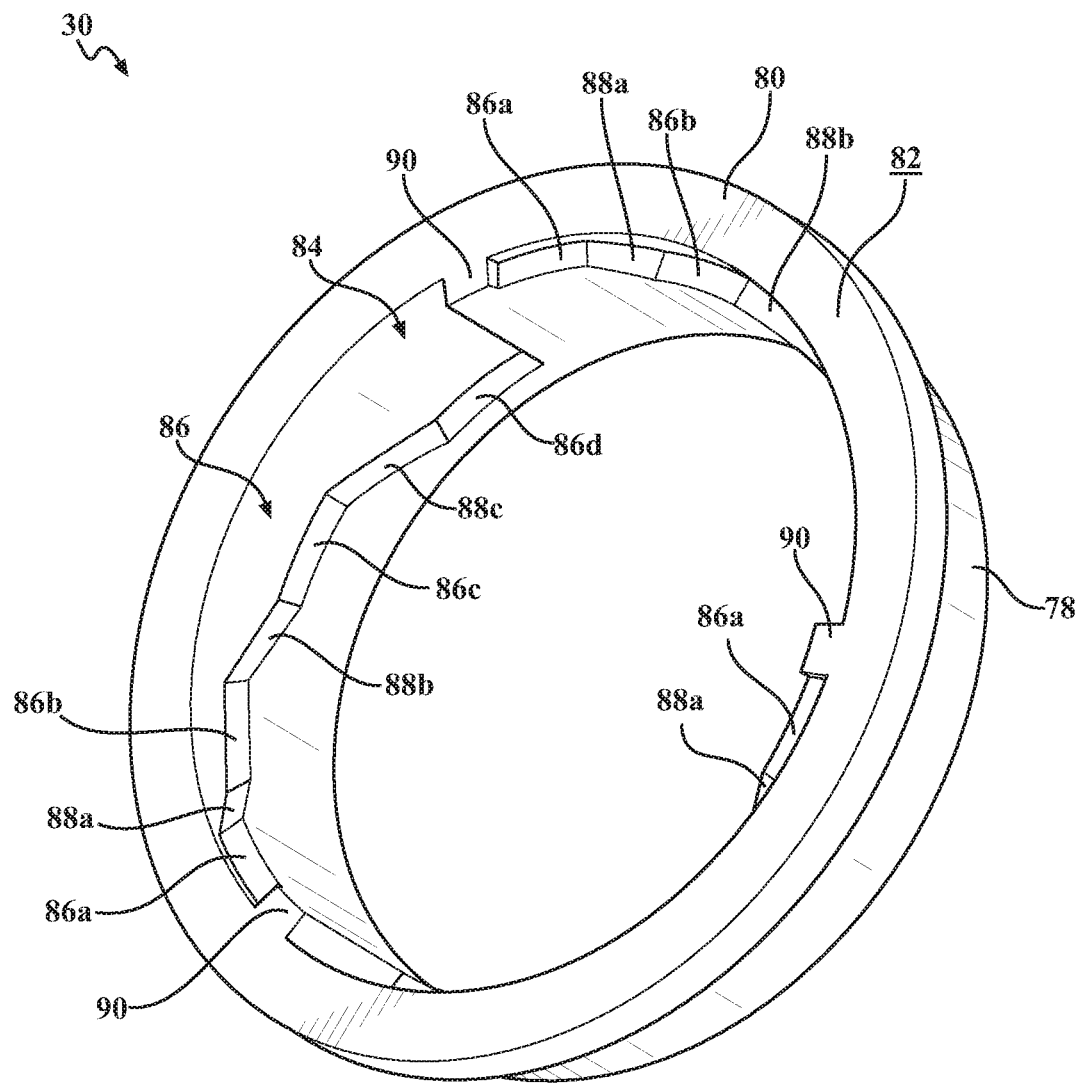
FIG. 7 is a perspective view of an outer cam ring of the PTU assembly of FIG. 1.
Figure 8:
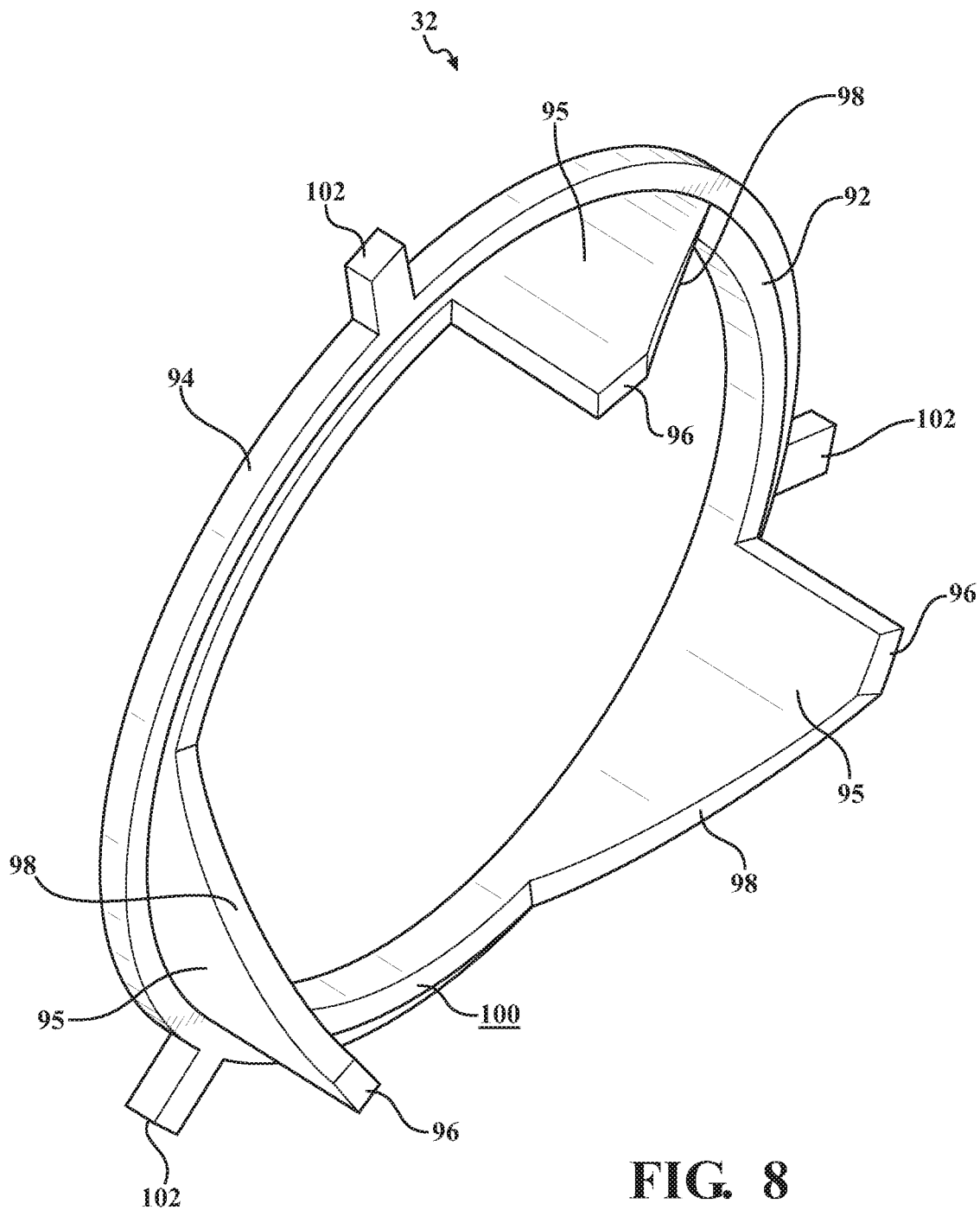
FIG. 8 is a perspective view of an inner cam ring of the PTU assembly of FIG. 1.

Referring to FIGS. 1 and 2, the input shaft 12 may receive torque from a transmission, motor, or any other suitable device that drives rotation of the input shaft 12 about a central axis $A_{12}$. As used herein, "distal" refers to a location further from a center of the vehicle along the central axis $A_{12}$ and "proximal" refers to a location closer to the center of the vehicle along the central axis $A_{12}$. For example, referring to FIG. 1, a location furthest to the left is the most proximal and a location furthest to the right is the most distal. As will become apparent, the input shaft 12 selectively transfers the torque throughout various components of the PTU assembly 10. By selectively transferring the torque, the PTU assembly 10 may effectively control or modify the amount of torque that is delivered to wheels of the vehicle.

With continued reference to FIGS. 1 and 2, the PTU assembly 10 includes a planetary gear subassembly 24, a differential gear subassembly 26, a shift collar 28, an outer cam ring 30, and an inner cam ring 32. The planetary gear subassembly 24 is distal to the input shaft 12. The planetary gear subassembly 24 includes a planetary cage 34 selectively engageable with the shift collar 28. Additionally, the planetary cage 34 is surrounded by the outer cam ring 30. The planetary gear subassembly 24 includes a sun gear 36 rotatable about the central axis $A_{12}$. The sun gear 36 includes a first set of clutch teeth 38 on a proximal portion of the sun gear 36. The planetary gear subassembly 24 includes a plurality of planet gears 40 surrounding and engaged with the sun gear 36. In some implementations, there may be four planet gears 40 and in other implementations, there may be any suitable number of planet gears 40. The planet gears 40 may be engaged with the sun gear 36 via teeth such that as the sun gear 36 rotates, the planet gears 40 rotate around the sun gear 36. In some implementations, the sun gear 36 drives rotation of the planet gears 40 and in other implementations, the planet gears 40 drive rotation of the sun gear 36. The planetary gear subassembly 24 includes a ring gear 42 surrounding and engaged with the planet gears 40. The ring gear 42 is fixed relative to the planet gears 40, e.g., the ring gear 42 may be fixed to the housing. The ring gear 42 is engaged with the planet gears 40 via teeth, such that the planet gears 40 may move along the ring gear 42 while the ring gear 42 remains stationary.

The differential gear subassembly 26 is positioned distal to the planetary gear subassembly 24. The differential gear subassembly 26 includes a housing 44 and a plurality of differential gears 46 disposed within the housing 44. The differential gears 46 may be engaged with one another to allow an outer wheel of the vehicle to rotate faster than an inner wheel of the vehicle during a turn. The sun gear 36 may be engaged with the differential gear subassembly 26 such that torque transferred through the planetary gear subassembly 24 and the planetary cage 34 to the differential gear subassembly 26 at the first torque ratio. The planetary cage 34 may be engaged with the differential gear subassembly 26 such that torque transferred through the planetary cage 34 be transferred to the differential gear subassembly 26 at the second torque ratio. The first and the second ratios are different, hence the torque transferred. The planetary cage 34 serves as a component in both the differential gear subassembly 26 and the planetary gear subassembly 24. The first torque ratio may be different than, less than, equal to, or greater than the second torque ratio. For example, the first torque ratio may be 2:1 and the second torque transfer ratio may be 1:3.

The PTU assembly 10 may include a motor 48 adjacent the planetary gear subassembly 24 and the differential gear subassembly 26. The motor 48 includes a stator 50 and a rotor 52 rotatable relative to the stator 50. The rotor 52 rotates about a rotor axis $A_{52}$ that is parallel to and spaced from the central axis Au. In some implementations, the rotor 52 may engage and drive rotation of an idle gear 54, which, in turn, drives rotation of the outer cam ring 30. In other implementations, the rotor 52 directly engages and drives rotation of the outer cam ring 30.

Referring to FIGS. 2-6B, the shift collar 28 is engaged with the input shaft 12. For example, the input shaft 12 may include an outer spline 56 on an outer surface of the input shaft 12, and the shift collar 28 may include an inner spline 58 meshingly-engaged with the outer spline 56. In other implementations, the shift collar 28 may be engaged with the input shaft 12 via a keyed connection or any other suitable connection. The shift collar 28 may be rotationally aligned with the input shaft 12. That is, the input shaft 12 may drive rotation of the shift collar 28 via the engagement of the outer spline 56 and the inner spline 58. The shift collar 28 may extend from the input shaft 12 to the planetary cage 34 and may be selectively engageable with the intermediate shaft 14 and the planetary cage 34.

Figure 9:
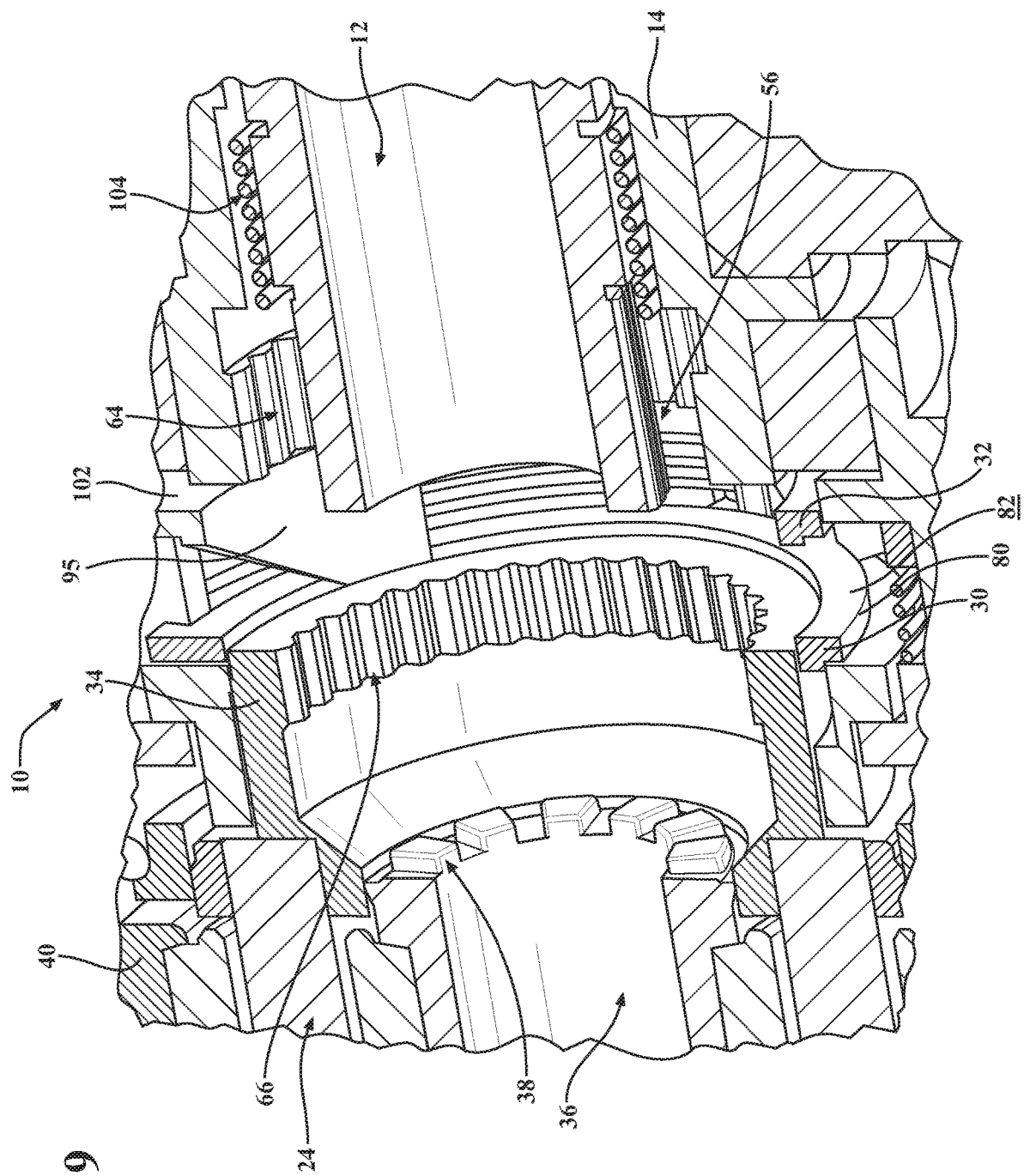
FIG. 9 is cross-sectional view of a portion of the PTU assembly of FIG. 1 with some components removed to provide clarity, taken along line 9-9 in FIG. 1.

The shift collar 28 includes a first set of teeth 60 on an outer surface of the shift collar 28 near a proximal end of the shift collar 28 and a second set of teeth 62 on the outer surface of the shift collar 28 near a distal end of the shift collar 28. The first set of teeth 60 are meshingly-engageable with teeth 64 on an inner surface of the intermediate shaft 14. The second set of teeth 62 are meshingly-engageable with teeth 66 (best seen in FIG. 9 which has the shift collar 28 removed for clarity) on an inner surface of the planetary cage 34. The shift collar 28 includes second clutch teeth 68 at the distal end of the shift collar 28. The second clutch teeth 68 are meshingly-engageable with the first clutch teeth 38 of the sun gear 36.

The shift collar 28 is operable between: (i) a first position (FIG. 10A) where the first set of teeth 60 are disengaged with the teeth 64 of the intermediate shaft 14, the second set of teeth 62 are engaged with the teeth 66 of the planetary cage 34, and the second clutch teeth 68 are disengaged with the first clutch teeth 38; (ii) a second position (FIG. 10B) where the first set of teeth 60 are engaged with the teeth 64 of the intermediate shaft 14, the second set of teeth 62 are engaged with the teeth 66 of the planetary cage 34, and the second clutch teeth 68 are disengaged with the first clutch teeth 38; (iii) a third position (FIG. 10C) where the first set of teeth 60 are engaged with the teeth 64 of the intermediate shaft 14, the second set of teeth 62 are disengaged with the teeth 66 of the planetary cage 34, and the second clutch teeth 68 are disengaged with the first clutch teeth 38; and (iv) a fourth position (FIG. 10D) where the first set of teeth 60 are engaged with the teeth 64 of the intermediate shaft 14, the second set of teeth 62 are disengaged with the teeth 66 of the planetary cage 34, and the second clutch teeth 68 are engaged with the first clutch teeth 38. Thus, the shift collar 28 is selectively engageable with the planetary gear subassembly 24 and the differential gear subassembly 26.

The first position (FIG. 10A) may be referred to as a two-wheel, high position, indicating that two wheels are operated at high speed and low torque. The second position (FIG. 10B) may be referred to as a four-wheel, high position, indicating that four wheels are operated at high speed and low torque. The third position (FIG. 10C) may be referred to as a neutral position, indicating that the wheels do not receive any torque. The fourth position (FIG. 10D) may be referred to as a four-wheel, low position, indicating that four wheels are operated at low speed and high torque. The first position and the second position may operate at a first torque ratio based on a first gear ratio, and the fourth position may operate at a second torque ratio based on a second gear ratio. The first torque ratio and the first gear ratio may be greater than the second torque ratio and the second gear ratio.

The shift collar 28 further includes a flange 70 extending radially outward from the central axis $A_{12}$. In one exemplary arrangement, the flange 70 is located near a center portion of the shift collar 28. The flange 70 includes an outer surface 72, an inner surface 74, and a step 76 between the outer surface 72 and the inner surface 74. The outer surface 72 is disposed further radially outward than the inner surface 74. As described in greater detail below, the outer surface 72 is configured to engage a portion of the inner cam ring 32.

Referring to FIGS. 3-5 and 7, the outer cam ring 30 is disposed around a portion of the shift collar 28. In some implementations, the outer cam ring 30 is also disposed around a portion of the planetary cage 34. The outer cam ring 30 includes a ring 78 (best seen in FIG. 4) and a flange 80 extending radially outward from the ring 78. The outer cam ring 30 is rotatable about the central axis $A_{12}$. For example, the outer cam ring 30 may be rotatable via the rotor 52 of the motor 48 rotating the idle gear 54 which is engaged with the outer cam ring 30. In some implementations, the flange 80 may include teeth that engage with corresponding teeth of the rotor 52, such that the rotor 52 may drive rotation of the outer cam ring 30 via engagement of the teeth. In other implementations, the outer cam ring 30 may be rotatable in any suitable manner. The flange 80 includes an engagement surface 82 at a proximal end of the outer cam ring 30 that engages a portion of the inner cam ring 32. The engagement surface 82 generally faces the input shaft 12.

The ring 78 of the outer cam ring 30 includes an inner surface 84 that defines sets of levels 86 (best seen in FIG. 7) increasing in height relative to the engagement surface 82.

The levels 86 may be cutouts formed in the inner surface 84 or protrusions extending from the inner surface 84. There may be any suitable number of sets of levels 86. For example, as shown in the figures, there may be three sets of levels 86. Each set of levels 86 may include a first level 86a, a second level 86b, a third level 86c, and a fourth level 86d. Between the first level 86a and the second level 86b is a first transition portion 88a that is angled from the first level 86a to the second level 86b. Between the second level 86b and the third level 86c is a second transition portion 88b that is angled from the second level 86b to the third level 86c. Between the third level 86c and the fourth level 86d is a third transition portion 88c that is angled from the third level 86c to the fourth level 86d. Adjacent the fourth level 86d is a catch 90 that is substantially flush with the engagement surface 82 of the flange 80. Each of the levels 86a—d have a different height. For example, when the outer cam ring 30 is assembled into the PTU assembly 10, a distance from the second level 86b to the most distal end of the input shaft 12 along the central axis $A_{11}$ is greater than a distance from the first level 86a to the most distal end of the input shaft 12 along the central axis $A_{12}$. Likewise, a distance from the third level 86c to the most distal end of the input shaft 12 along the central axis $A_{12}$ is greater than a distance from the second level 86b to the most distal end of the input shaft 12 along the central axis $A_{12}$, and so on.

Referring to FIGS. 3-5 and 8, the inner cam ring 32 is engaged with the shift collar 28 and disposed radially inward from the outer cam ring 30. In other implementations, the inner cam ring 32 may have any suitable orientation relative to the outer cam ring 30, e.g., the inner cam ring 32 may be disposed radially outward from the outer cam ring 30. The inner cam ring 32 includes a ring 92 and a flange 94 extending radially outward from the ring 92. The ring 92 may include jaws 95 (best seen in FIG. 8) extending in a distal direction. There may be any suitable number of jaws 95, for example, as shown in the figures, there may be three jaws 95. Each of the jaws 95 may include a foot 96 and a slope 98 extending from the foot 96 toward the ring 92 at an angle. The foot 96 is configured to selectively engage each of the levels 86a—d.

In the first position (FIG. 10A), each foot 96 of the inner cam ring 32 may engage the first levels 86a of the outer cam ring 30. In the second position (FIG. 10B), each foot 96 of the inner cam ring 32 may engage the second levels 86b of the outer cam ring 30. In the third position (FIG. 10C), each foot 96 of the inner cam ring 32 may engage the third levels 86c of the outer cam ring 30. In the fourth position (FIG. 10D), each foot 96 of the inner cam ring 32 may engage the fourth levels 86d of the outer cam ring 30.

The flange 94 includes an engagement surface 100 configured to engage the engagement surface 82 of the flange 80 of the outer cam ring 30. The flange 94 includes a plurality of tabs 102 extending radially outward from the flange 80. There may be any suitable number of tabs 102, for example, as shown in the figures, there may be three tabs 102. The tabs 102 may engage a slot or guide (not shown) in any suitable component, e.g., the housing, such that the engagement of the tabs 102 with the guide prohibits a rotational motion of the inner cam ring 32. That is, the inner cam ring 32 is prohibited from rotating and may only move transversely along the central axis $A_{12}$.

Referring to FIGS. 10A-10D, the PTU assembly 10 may include a spring 104 exerting a biasing force upon the shift collar 28 to bias the shift collar 28 toward the outer cam ring 30. That is, the spring 104 biases the shift collar 28 toward the engagement of the first clutch teeth 38 of the sun gear 36 and the second clutch teeth 68 of the shift collar 28. The spring 104 may be any suitable spring, such as, for example, a helical compression spring, a conical spring, a disc or Belleville spring, etc. In other implementations, the shift collar 28 may be biased toward the outer cam ring 30 in any suitable manner.

Figure 10A:
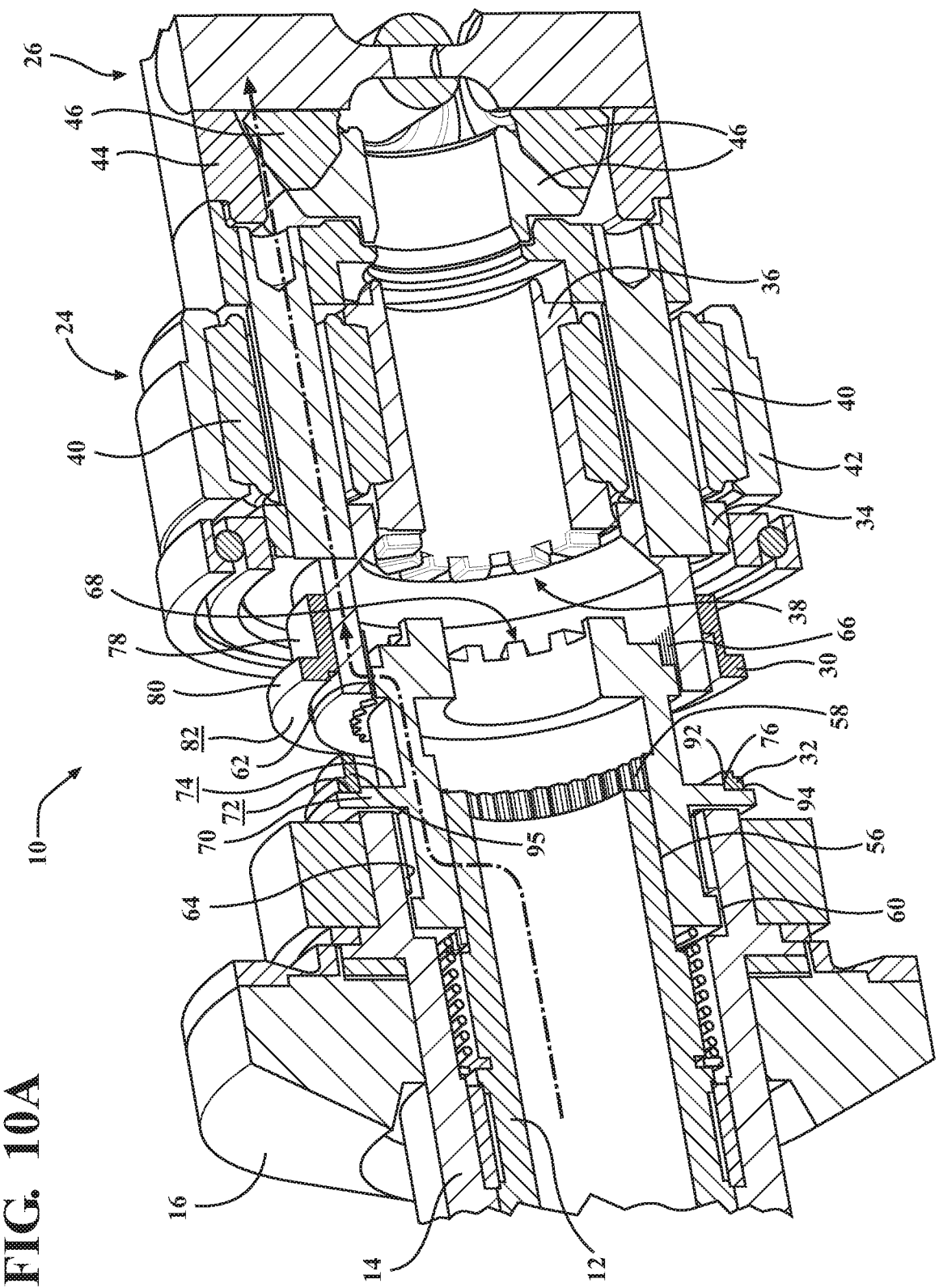
FIG. 10A is a cross-sectional view of the PTU assembly of FIG. 9 in a first position.

Referring to FIG. 10A, the shift collar 28 may be disposed in the first position. In the first position, the first set of teeth 60 are disengaged with the teeth 64 of the intermediate shaft 14, the second set of teeth 62 are engaged with the teeth 66 of the planetary cage 34, the second clutch teeth 68 are disengaged with the first clutch teeth 38, and the foot 96 of each jaw 95 is engaged with the first level 86a, i.e., the shortest level. In the first position, torque is transferred from the input shaft 12 to the shift collar 28 via engagement of the outer spline 56 and the inner spline 58. Torque is then transferred from the shift collar 28 to the planetary cage 34 via engagement of the second set of teeth 62 and the teeth 66. Torque is then transferred to the differential gear subassembly 26 through the planetary cage 34. The arrows in FIG. 10A illustrate the torque path in the first position.

Figure 10B:
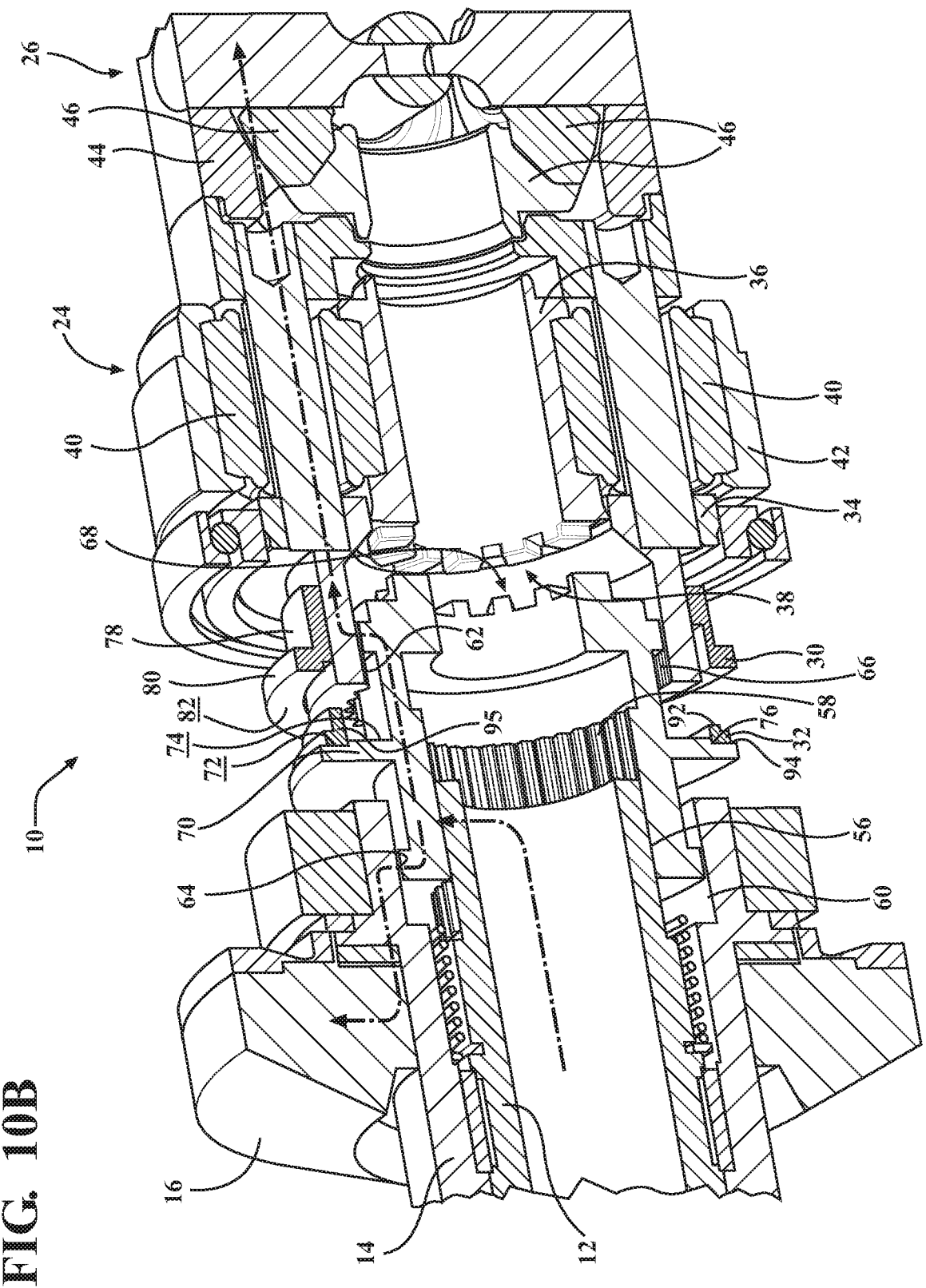
FIG. 10B is a cross-sectional view of the PTU assembly of FIG. 9 in a second position.

Referring to FIG. 10B, the shift collar 28 may be disposed in the second position. In the second position, the first set of teeth 60 are engaged with the teeth 64 of the intermediate shaft 14, the second set of teeth 62 are engaged with the teeth 66 of the planetary cage 34, the second clutch teeth 68 are disengaged with the first clutch teeth 38, and the foot 96 of each jaw 95 is engaged with the second level 86b, i.e., the second shortest level. In the second position, torque is transferred from the input shaft 12 to the shift collar 28 via engagement of the outer spline 56 and the inner spline 58. Torque is then transferred from the shift collar 28 to the intermediate shaft 14 via engagement of the first set of teeth 60 and the teeth 64, and torque is transferred from the shift collar 28 to the planetary cage 34 via engagement of the second set of teeth 62 and the teeth 66. Torque is then transferred to the differential gear subassembly 26 through the planetary cage 34. The arrows in FIG. 10B illustrate the torque path in the second position.

Figure 10C:
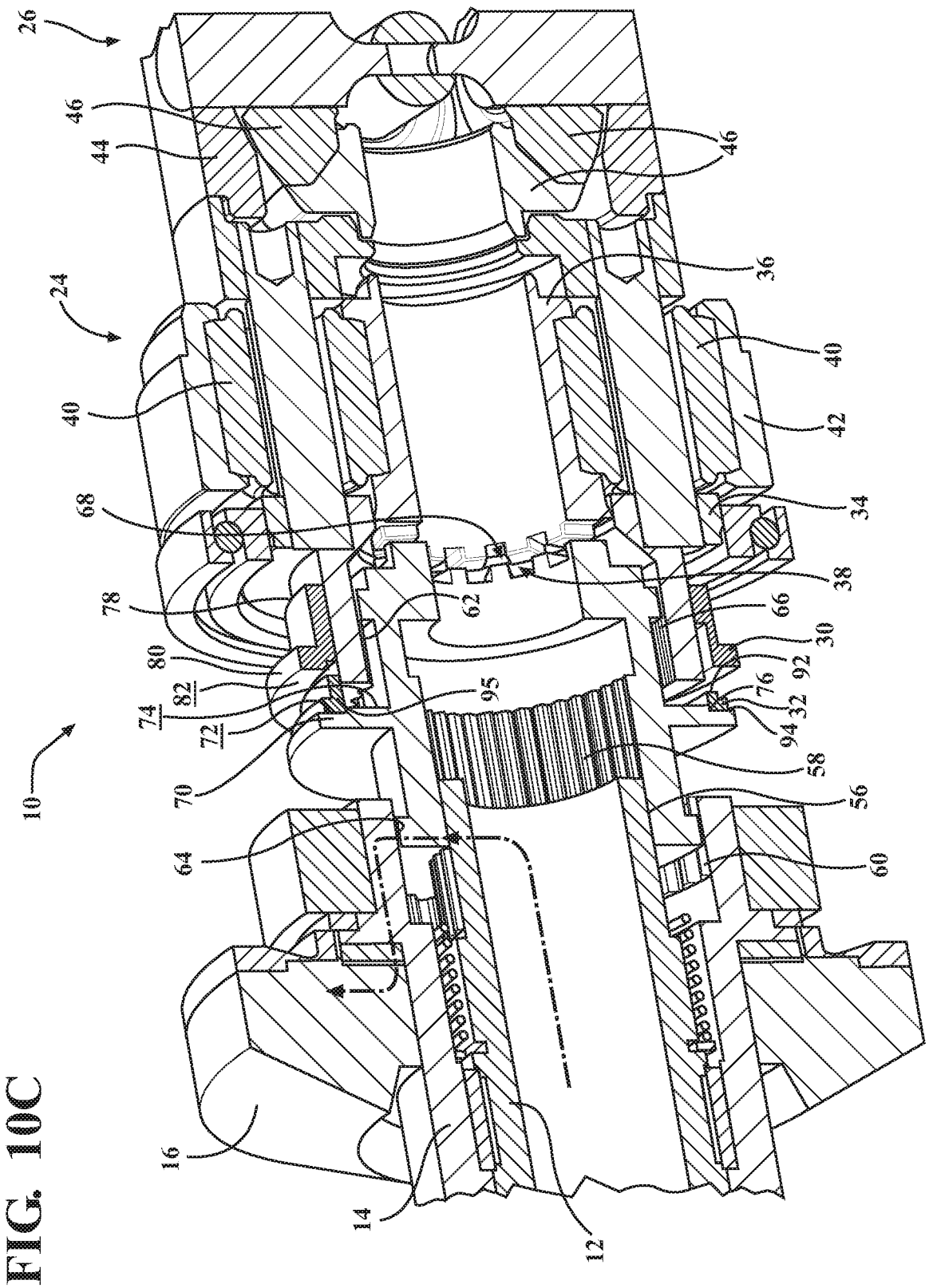
FIG. 10C is a cross-sectional view of the PTU assembly of FIG. 9 in a third position.

Referring to FIG. 10C, the shift collar 28 may be disposed in the third position. In the third position, the first set of teeth 60 are engaged with the teeth 64 of the intermediate shaft 14, the second set of teeth 62 are disengaged with the teeth 66 of the planetary cage 34, the second clutch teeth 68 are disengaged with the first clutch teeth 38, and the foot 96 of each jaw 95 is engaged with the third level 86c, i.e., the second tallest level. In the third position, torque is transferred from the input shaft 12 to the shift collar 28 via engagement of the outer spline 56 and the inner spline 58. Torque is then transferred from the shift collar 28 to the intermediate shaft 14 via engagement of the first set of teeth 60 and the teeth 64. The arrows in FIG. 10C illustrate the torque path in the third position.

Figure 10D:
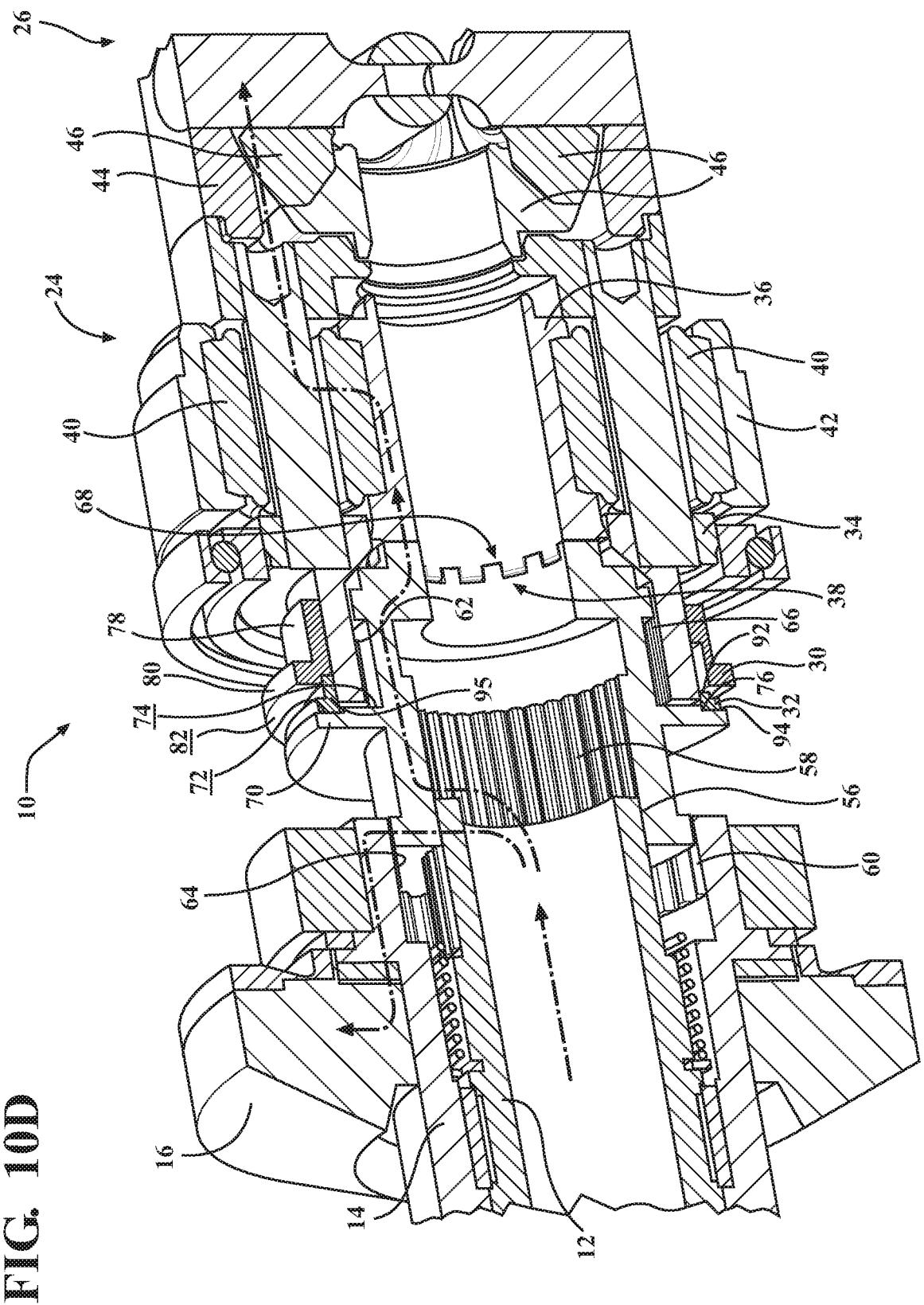
FIG. 10D is a cross-sectional view of the PTU assembly of FIG. 9 in a fourth position.

Referring to FIG. 10D, the shift collar 28 may be disposed in the fourth position. In the fourth position, the first set of teeth 60 are engaged with the teeth 64 of the intermediate shaft 14, the second set of teeth 62 are disengaged with the teeth 66 of the planetary cage 34, the second clutch teeth 68 are engaged with the first clutch teeth 38, and the foot 96 of each jaw 95 is engaged with the fourth level 86d, i.e., the tallest level. In the fourth position, torque is transferred from the input shaft 12 to the shift collar 28 via engagement of the outer spline 56 and the inner spline 58. Torque is then transferred from the shift collar 28 to the intermediate shaft 14 via engagement of the first set of teeth 60 and the teeth 64, and torque is transferred to the sun gear 36 via engagement of the first clutch teeth 38 and the second clutch teeth

68. Torque is then transferred through the sun gear 36, the planetary gear subassembly 24, and the planetary cage 34 to the differential gear subassembly 26. The arrows in FIG. 10D illustrate the torque path in the fourth position.

To move the shift collar 28 between the first position and the fourth position, the motor 48 is activated to rotate the outer cam ring 30. As the outer cam ring 30 rotates in a first direction (i.e., in a counterclockwise direction from the perspective of FIG. 3), the inner cam ring 32 overcomes the biasing force of the spring 104 and the foot 96 of each jaw 95 transitions from the first level 86a (the first position) to the first transition zone 88a to the second level 86b (the second position) to the second transition zone 88b to the third level 86c (the third position) to the third transition zone 88c and finally to the fourth level 86d (the fourth position). The foot 96 of each jaw 95 progressing along the levels 86a—d, causes the inner cam ring 32 to translate along the central axis $A_{11}$ toward the input shaft 12 until the second set of teeth 62 are engaged with the teeth 66 of the planetary cage 34 and the foot 96 of each jaw 95 is engaged with the fourth level 86d, i.e., the shortest level.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed herein could be termed a second element, component, region, layer or section without departing from the teachings of the example configurations.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle power transfer unit assembly, comprising:
   an input shaft;
   a shift collar engaged with the input shaft and operable between a first position, and a second position, a third position and a fourth position;
   an outer cam ring disposed around a portion of the shift collar, the outer cam ring including an inner surface defining a plurality of levels; and
   an inner cam ring engaged with the shift collar and disposed radially inward from the outer cam ring, the inner cam ring including a jaw engageable with the plurality of levels;
   wherein the shift collar is moved from one of the first position, the second position, the third position or the fourth position to a different one of the first position, the second position, the third position and the fourth position when the jaw is moved from engagement with one of the plurality of levels to engagement with another of the plurality of levels.

2. The vehicle power transfer unit assembly of claim 1, wherein the input shaft includes an outer surface having an outer spline and the shift collar includes an inner surface having an inner spline meshingly-engageable with the outer spline, and wherein the input shaft is configured to transfer a torque from the input shaft to the shift collar via engagement of the outer spline and the inner spline.

3. The vehicle power transfer unit assembly of claim 1, wherein the plurality of levels includes a first level and a second level, and a distance along a central axis of the outer cam ring from the first level to the input shaft is less than a distance along the central axis of the outer cam ring from the second level to the input shaft.

4. The vehicle power transfer unit assembly of claim 1, further comprising a spring exerting a biasing force upon the shift collar to bias the shift collar toward the outer cam ring.

5. The vehicle power transfer unit assembly of claim 4, wherein the jaw is selectively moveable from engagement with one of the plurality of levels to engagement with another of the plurality of levels by overcoming the biasing force of the spring.

6. The vehicle power transfer unit assembly of claim 1, wherein the shift collar is engaged with a first component in the first position and a second component in the second position, the engagement of the shift collar with the first component defining a first torque ratio and the engagement of the shift collar with the second component defining a second torque ratio different from the first torque ratio.

7. The vehicle power transfer unit assembly of claim 6, wherein the first component is part of a differential gear subassembly and the second component is part of a planetary gear subassembly.

8. The vehicle power transfer unit assembly of claim 1, further comprising a motor configured to drive rotation of the outer cam ring to selectively move the jaw from engagement with one of the plurality of levels to engagement with another of the plurality of levels.

9. The vehicle power transfer unit assembly of claim 1, further comprising a planetary gear subassembly and a differential gear subassembly, the shift collar being selectively engageable with the planetary gear subassembly and the differential gear subassembly.

10. A vehicle power transfer unit assembly, comprising:
an input shaft;
a shift collar engaged with the input shaft and operable between four positions including a first position, a second position, a third position, and a fourth position;
an outer cam ring disposed around a portion of the shift collar, the outer cam ring including an inner surface defining four levels including a first level, a second level, a third level, and a fourth level, the outer cam ring including an engagement surface facing the input shaft and each of the four levels increasing in distance from the engagement surface relative to an adjacent one of the four levels; and
an inner cam ring engaged with the shift collar and disposed radially inward from the outer cam ring, the inner cam ring including a jaw selectively engageable with each of the four levels;
wherein the shift collar is moved from one of the four positions to an adjacent one of the four positions when the jaw is moved from engagement with one of the plurality of levels to engagement with another of the plurality of levels.

11. The vehicle power transfer unit assembly of claim 10, wherein the input shaft includes an outer surface having an outer spline and the shift collar includes an inner surface having an inner spline meshingly-engageable with the outer spline, and wherein the input shaft is configured to transfer a torque from the input shaft to the shift collar via engagement of the outer spline and the inner spline.

12. The vehicle power transfer unit assembly of claim 10, further comprising a spring exerting a biasing force upon the shift collar to bias the shift collar toward the outer cam ring.

13. The vehicle power transfer unit assembly of claim 12, wherein the jaw is selectively moveable from engagement with one of the four levels to engagement with another of the four levels by overcoming the biasing force of the spring.

14. The vehicle power transfer unit assembly of claim 10, wherein the shift collar is engaged with a first component in the first position and a second component in the fourth position, the engagement of the shift collar with the first component defining a first torque ratio and the engagement of the shift collar with the second component defining a second torque ratio different from the first torque ratio.

15. The vehicle power transfer unit assembly of claim 14, wherein the first torque ratio is less than the second torque ratio.

16. The vehicle power transfer unit assembly of claim 14, wherein the first component is part of a differential gear subassembly and the second component is part of a planetary gear subassembly.

17. The vehicle power transfer unit assembly of claim 10, further comprising a motor configured to drive rotation of the outer cam ring to selectively move the jaw from engagement with one of the four levels to engagement with another of the four levels.

18. The vehicle power transfer unit assembly of claim 10, further comprising a planetary gear subassembly and a differential gear subassembly, the shift collar being selectively engageable with the planetary gear subassembly and the differential gear subassembly.

19. The vehicle power transfer unit assembly of claim 10, wherein when the shift collar is in the third position, no torque is transferred to wheels of the vehicle via a differential gear subassembly.

\* \* \* \* \*